United States Patent [19]

McIntyre et al.

[11] Patent Number: 5,422,805

[45] Date of Patent: Jun. 6, 1995

[54] METHOD AND APPARATUS FOR MULTIPLYING TWO NUMBERS USING SIGNED ARITHMETIC

[75] Inventors: Kenneth L. McIntyre; Donald C. Anderson; Mark E. Burchfield; Jeffery P. Bray, all of Austin, Tex.

[73] Assignee: Motorola, Inc., Schaumburg, Ill.

[21] Appl. No.: 964,329

[22] Filed: Oct. 21, 1992

[51] Int. Cl.$^6$ .......................... G06F 7/52; G06F 7/00; G06F 11/00

[52] U.S. Cl. .................. 364/757; 364/736.5; 364/737

[58] Field of Search .............. 364/715.01, 715.04, 364/736, 736.5, 737, 745, 748, 757, 715.10

[56] References Cited

U.S. PATENT DOCUMENTS

| | | | |
|---|---|---|---|
| 4,649,508 | 3/1987 | Kanuma | 364/748 |
| 4,789,956 | 12/1988 | Hildebrandt | 364/715.04 X |
| 4,941,119 | 7/1990 | Moline | 364/745 |
| 4,945,507 | 7/1990 | Ishida et al. | 364/737 |
| 5,038,313 | 8/1991 | Kojima | 364/736.5 |
| 5,128,890 | 7/1992 | Girardeau | 364/757 |
| 5,262,973 | 11/1993 | Richardson | 364/736 |

*Primary Examiner*—Roy N. Envall, Jr.
*Assistant Examiner*—Chuong D. Ngo
*Attorney, Agent, or Firm*—Paul J. Polansky

[57] ABSTRACT

A signed arithmetic data processing system (20) detects a multiply (MUL) or a multiply-and-accumulate (MAC) instruction in which a multiplier and a multiplicand each assume their respective maximum negative values. If one or both of the operands is not equal to its maximum negative value, the multiplication proceeds normally, such as in a modified Booth's multiplier/MAC (33). However, if both operands are equal to their respective maximum negative values, the data processing system (20) substitutes a maximum positive constant for the output of the multiplier/MAC (33). This substitution allows the result to be expressed with one fewer bits. The resulting error is very small and becomes insignificant in most digital signal processing algorithms, especially those based on fractional, saturation arithmetic. Alternatively, an extra bit of precision may be achieved for a given hardware size.

13 Claims, 2 Drawing Sheets

METHOD AND APPARATUS FOR MULTIPLYING TWO NUMBERS USING SIGNED ARITHMETIC

FIELD OF THE INVENTION

This invention relates generally to arithmetic methods and circuits, and more particularly, to a method and apparatus for multiplication using signed arithmetic.

BACKGROUND OF THE INVENTION

A variety of integrated circuits, including general-purpose data processors and digital signal processors (DSPs), perform multiplications. Two multiplication operands, known generally as the multiplier and the multiplicand, are typically provided to dedicated multiplier circuitry. The speed and complexity of the multiplier circuitry varies with the application. For example, a hardware multiplier using a modified Booth's algorithm is preferred for many high-speed applications. A serial multiplier, however, may be preferred for more cost-sensitive applications which do not require as high a level of performance.

The operands are usually expressed as signed values in two's complement form. In two's complement, a most-significant bit is a sign bit in which a zero represents a positive number and a one represents a negative number. A negative number is expressed in two's complement by complementing each bit of a corresponding positive number and adding one to the result.

However, the two's complement number system is asymmetrical, which may complicate the multiplier circuitry. An example with numbers expressed in 4-bit, two's complement form illustrates this asymmetry. While the maximum positive number, expressed in binary as 0111, has a value of positive seven, the maximum negative number, expressed in binary as 1000, has a value of negative eight. Thus, two's complement is able to express a maximum negative number having an absolute value of one greater than the maximum positive number. As used in the following discussion, the binary quantity "0111" has a most-significant or fourth bit of "0", and three least-significant bits or first, second, and third bits of "1".

This asymmetry becomes significant during some multiplications. Consider the case of an integer multiplication between two 4-bit two's complement numbers. Each integer operand may be expressed by a most-significant sign bit and three integer bits. The product can normally be expressed as a sign bit and six integer bits, or a total of (M+N−1) bits, where M and N represent the number of bits in the multiplier and multiplicand, respectively. For example, TABLE I illustrates a 4-bit-by-4-bit two's complement integer multiplication between −7 and −7:

TABLE I

| Decimal representation | Two's complement representation | Binary representation of corresponding positive number | | | | | | | |
|---|---|---|---|---|---|---|---|---|---|
| −7 | 1001 | | | | | 0 | 1 | 1 | 1 |
| × −7 | × 1001 | | | | × | 0 | 1 | 1 | 1 |
| +49 | | | | | | 0 | 1 | 1 | 1 |
| | | | | | 0 | 1 | 1 | 1 | |
| | | | | 0 | 1 | 1 | 1 | | |
| | | | 0 | 0 | 0 | 0 | | | |
| | | 0 | 0 | 1 | 1 | 0 | 0 | 0 | 1 |
| | | S | S | I | I | I | I | I | I | where S represents the sign bits and I the integer bits. Since the sign bits are the same, the eighth bit may be truncated, and the product of −7 and −7 can be expressed with a sign bit and (4+4−2) integer bits using a 7-bit two's complement representation. Note that (M+N−1) bits are sufficient for all other combinations in the number system except for a multiplication between two operands which are each equal to their maximum negative values.

For this special case, known as the maximum negative squared case, (M+N−1) bits are insufficient to express the product. For example, in 4-bit-by-4-bit two's complement, if −8 is multiplied by −8, the product is equal to +64. TABLE II illustrates the maximum negative squared case for 4-bit-by-4-bit two's complement:

TABLE II

| Decimal representation | Two's complement representation | Binary representation of corresponding positive number | | | | | | | |
|---|---|---|---|---|---|---|---|---|---|
| −8 | 1000 | | | | | 1 | 0 | 0 | 0 |
| × −8 | × 1000 | | | | × | 1 | 0 | 0 | 0 |
| +64 | | | | | | 0 | 0 | 0 | 0 |
| | | | | | 0 | 0 | 0 | 0 | |
| | | | | 0 | 0 | 0 | 0 | | |
| | | | 1 | 0 | 0 | 0 | | | |
| | | 0 | 1 | 0 | 0 | 0 | 0 | 0 | 0 |
| | | S | I | I | I | I | I | I | I |

In the maximum negative squared case, the sign bit and the most-significant integer bits are not the same, indicating that the product cannot be represented in (M+N−1) bits. If the sign bit were to be truncated, the result in 7-bit two's complement is negative sixty-four, which is the worst (most-incorrect) result. In general, for the maximum negative squared case, the product of an M-bit multiplier and an N-bit multiplicand can only be represented in (M+N)-bit two's complement. Thus, the size of the arithmetic circuitry, data paths, and registers must be increased by one bit to precisely represent the product in the maximum negative squared case, increasing integrated circuit cost and power consumption.

SUMMARY OF THE INVENTION

Accordingly, there is provided, in one form, a method for multiplying two numbers using signed arithmetic. A multiplication instruction in which first and second operands assume respective first and second maximum negative values thereof is detected. The first and second operands are provided respectively to first and second inputs of a multiplier. An output of the multiplier is provided as a result in response to either the first operand not equalling the first maximum negative value, or the second operand not equalling the second maximum negative value. A maximum positive constant is substituted as the result in response to both the first operand equaling the first maximum negative value and the second operand equaling the second maximum negative value.

There is provided, in another form, an apparatus for multiplying two numbers using signed arithmetic, comprising comparator means and substitution means. The comparator means receives first and second operands. The comparator means also provides a control signal in response to the first and second operands each being a respective maximum negative value. The substitution means provides a maximum positive constant as a result in response to said control signal.

These and other features and advantages will be more clearly understood from the following detailed description taken in conjunction with the accompanying drawings.

DETAILED DESCRIPTION OF A PREFERRED EMBODIMENT

Figure 1:
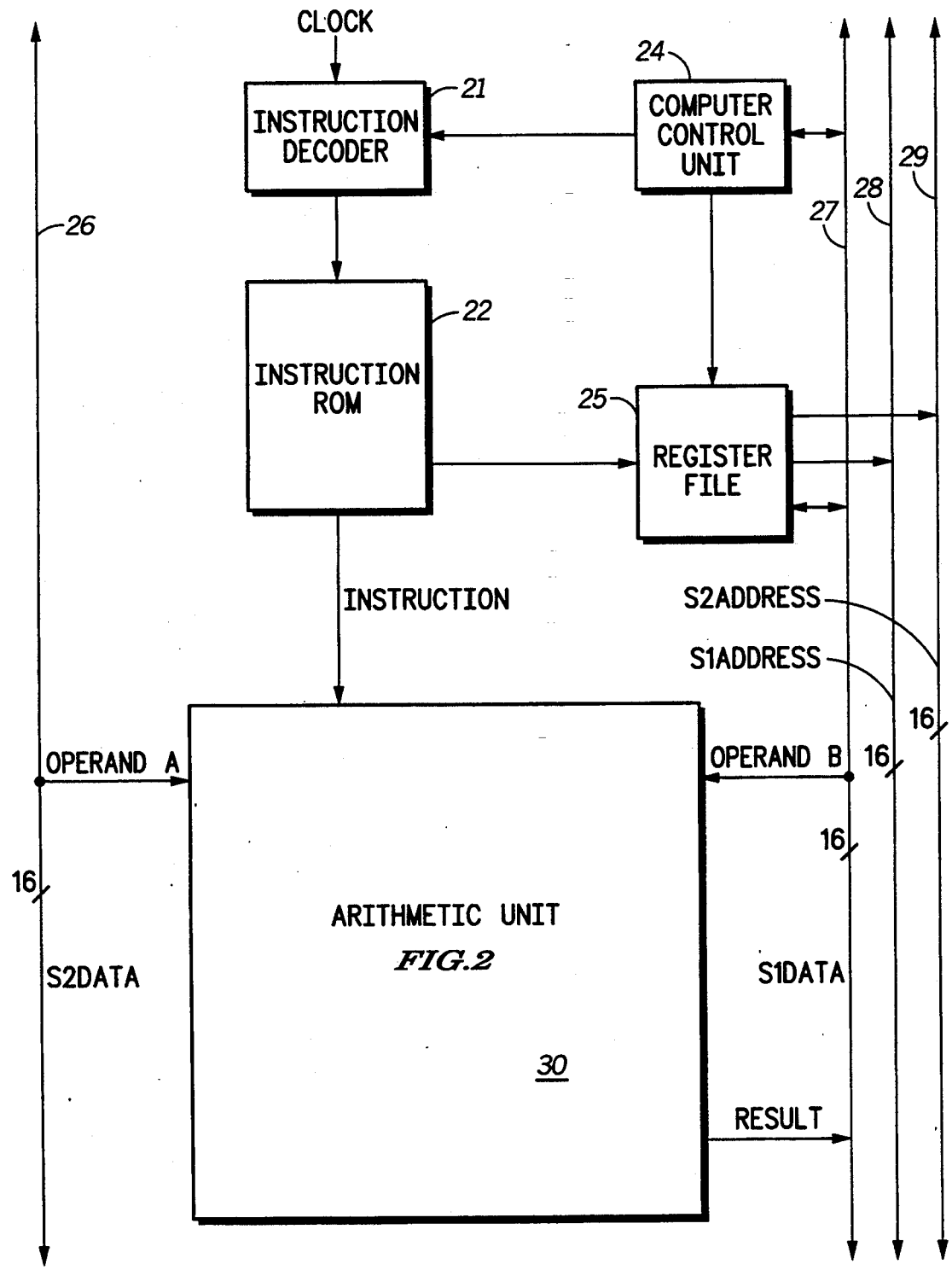
FIG. 1 illustrates in block diagram form a data processing system for multiplying two signed numbers in accordance with the present invention.

FIG. 1 illustrates in block form a data processing system 20 for multiplying two signed numbers in accordance with the present invention. In particular, data processing system 20 is capable of handling the maximum negative squared case in a way that avoids the problems with known methods. Data processing system 20 includes generally an instruction decoder 21, an instruction read only memory (ROM) 22, a computer control unit (CCU) 24, a register file 25, a data path 26 labelled "S2DATA", a data path 27 labelled "S1DATA", an address bus 28 labelled "S1ADDRESS", an address bus 29 labelled "S2ADDRESS", and arithmetic unit 30.

Instruction decoder 21 receives a clock signal labelled "CLOCK" and is coupled to CCU 24 for receiving an external instruction. Instruction ROM 22 provides an output to register file 25, and provides an output labelled "INSTRUCTION" to arithmetic unit 30. CCU 24 is coupled to the S1DATA path, and provides outputs to instruction decoder 21 and register file 25. Register file 25 receives inputs from instruction ROM 22 and CCU 24, is coupled to the S1DATA path, and provides outputs to the S1ADDRESS and S2ADDRESS buses.

Data processing system 20 has two data paths, the S1DATA path and the S2DATA path, accessed respectively by the S1ADDRESS and S2ADDRESS buses. Data processing system 20 is based on reduced instruction set computer (RISC) architecture. Instead of having internal microcode routines for executing a large instruction set, data processing system 20 responds more quickly to a fewer number of external instructions. In response to an external instruction fetched by CCU 24, instruction decoder 21 provides an address to instruction ROM 22 which corresponds to the external instruction. The INSTRUCTION represents the contents of this address in instruction ROM 22. The INSTRUCTION is also provided to other blocks of data processing system 20, including arithmetic unit 30, for further decoding. However, it should be apparent that in other embodiments of the present invention, different architectures including a microcoded complex instruction set computer (CISC) architecture may be used.

Arithmetic unit 30 is connected to instruction ROM 22 and receives the INSTRUCTION to activate specific hardware after further decoding. Arithmetic unit 30 is connected to the S2DATA path for receiving a first operand labelled "OPERAND A", and to the S1DATA path for receiving a second operand labelled "OPERAND B", and provides a 16-bit output labelled "RESULT" to the S1DATA path. In the illustrated embodiment, register file 25 may also provide OPERAND A and OPERAND B but FIG. 1 omits these and other additional details which are unnecessary to understanding the present invention.

Data processing system 20 includes features which optimize it for digital signal processing (DSP) operations. For example, data processing system 20 includes two address and two data paths which are helpful in performing computation-intensive DSP routines. Besides multiply (MUL) instructions, arithmetic unit 30 performs multiply-and-accumulate (MAC) instructions which are frequently encountered in DSP routines. For example, a DSP implementing a finite impulse response (FIR) filter function must multiply each of a number of samples of an input signal by corresponding filter coefficients, and sum each of these products to provide the RESULT. Data processing system 20 implements this algorithm efficiently through the MAC instruction. Arithmetic unit 30 also uses saturation arithmetic: if an accumulated sum exceeds a maximum (highest-positive) value, or is less than a minimum (lowest-negative) value, it saturates and arithmetic unit 30 keeps the result at the maximum or minimum value instead of "rolling over".

Several methods have been used to handle the maximum negative squared case. One method expands the width of the circuitry involved. For the 4-bit two's complement example above, while seven bits are insufficient to express positive sixty-four in two's complement, eight bits clearly are sufficient, since 8-bit two's complement is able to represent a maximum positive value of 127. Thus, in this method, the width of the circuitry is expanded to (M+N) bits to accommodate the maximum negative squared case. However, this approach has drawbacks. All hardware involved, such as a multiplier, an arithmetic logic unit (ALU), and the like must be increased in size to accommodate the extra bit. Busses which conduct the product, and registers which store the product, also must be increased in size. The result is increased integrated circuit size and increased power consumption. Also, having an extra bit in the multiplier's carry chain, which is on its critical path, increases multiplication time.

If the result of the M-by-N multiplication is to be stored in (M+N−1) bits, several methods exist to handle the maximum negative squared case. One method simply ignores the maximum negative squared case. In a 4-bit-by-4-bit two's complement multiplication, the maximum negative squared result provided by a multiplier would be 01000000. If the highest-order bit were then discarded, the result would be negative sixty-four. However, negative sixty-four is the most incorrect result for the maximum negative squared case in 7-bit two's complement. In some applications the incidence of the maximum negative squared case is statistically very small and an infrequent error is tolerable. For example, in a telephone application, an incorrect result in the maximum negative squared case may result in a very infrequent popping sound in the earpiece. Although undesirable, such a result is tolerable.

Another method utilizes software or firmware to trap the maximum negative squared case. An exception handler routine then represents the result with a largest available positive value. The problem with this approach is that such an exception causes a multi-cycle overhead when the exception is taken, and thus can greatly increase the worst-case cycle count for multiply-intensive, real-time applications.

Yet another method is applicable in fractional arithmetic systems. In fractional arithmetic, a 16-bit operand is expressed as a sign bit and fifteen fractional (mantissa) bits. The most significant mantissa bit represents a fractional value of one-half, the second most significant mantissa bit represents a fractional value of one-fourth, and so on. In these systems, the least significant bit of an (M+N)-bit product may be truncated, rather than the sign bit. However, this technique reduces the precision of the result by one bit while maintaining the magnitude of the result.

In accordance with the present invention, when data processing system 20 receives a MUL or MAC instruction which is not the maximum negative squared case, arithmetic unit 30 forms the RESULT of the multiplication. In response to a MUL instruction, arithmetic unit 30 multiplies the two operands to provide the RESULT. In response to a MAC instruction, arithmetic unit 30 multiplies the two operands and adds the result of the multiplication to an accumulated value. Arithmetic unit 30 then provides the sum as the RESULT.

Data processing system 20 is able to overcome the problems with the previously-known solutions to the maximum negative squared case. Data processing system 20 also provides the RESULT in response to the maximum negative squared case after a MUL or MAC instruction, without expanding the size of associated hardware or providing the most-incorrect result. Arithmetic unit 30 first detects the maximum negative squared case. In response to a MUL instruction, arithmetic unit 30 then substitutes a value labelled "MAXIMUM POSITIVE CONSTANT" for the product when the RESULT is to be stored in memory or a register. In response to a MAC instruction, arithmetic unit 30 retains enough bits in an accumulator to indicate the occurrence of the maximum negative squared case. If this result is subsequently to be provided to memory or a register, arithmetic unit 30 provides MAXIMUM POSITIVE CONSTANT as the RESULT.

Thus, data processing system 20 saves integrated circuit area and power by decreasing the size of hardware and data paths by one bit. Alternatively, data processing system 20 provides virtually one extra bit of precision for a given hardware and data path size. The error introduced by substituting MAXIMUM POSITIVE CONSTANT for a true product, which can only be represent in two's complement arithmetic by adding an extra bit, is very small and acceptable in most or all DSP operations. The incidence of the maximum negative squared case with random operands is statistically very small as well. In addition, since many DSP algorithms use saturation arithmetic, the difference between the true product and MAXIMUM POSITIVE CONSTANT does not affect the outcome when the algorithm saturates anyway.

Figure 2:
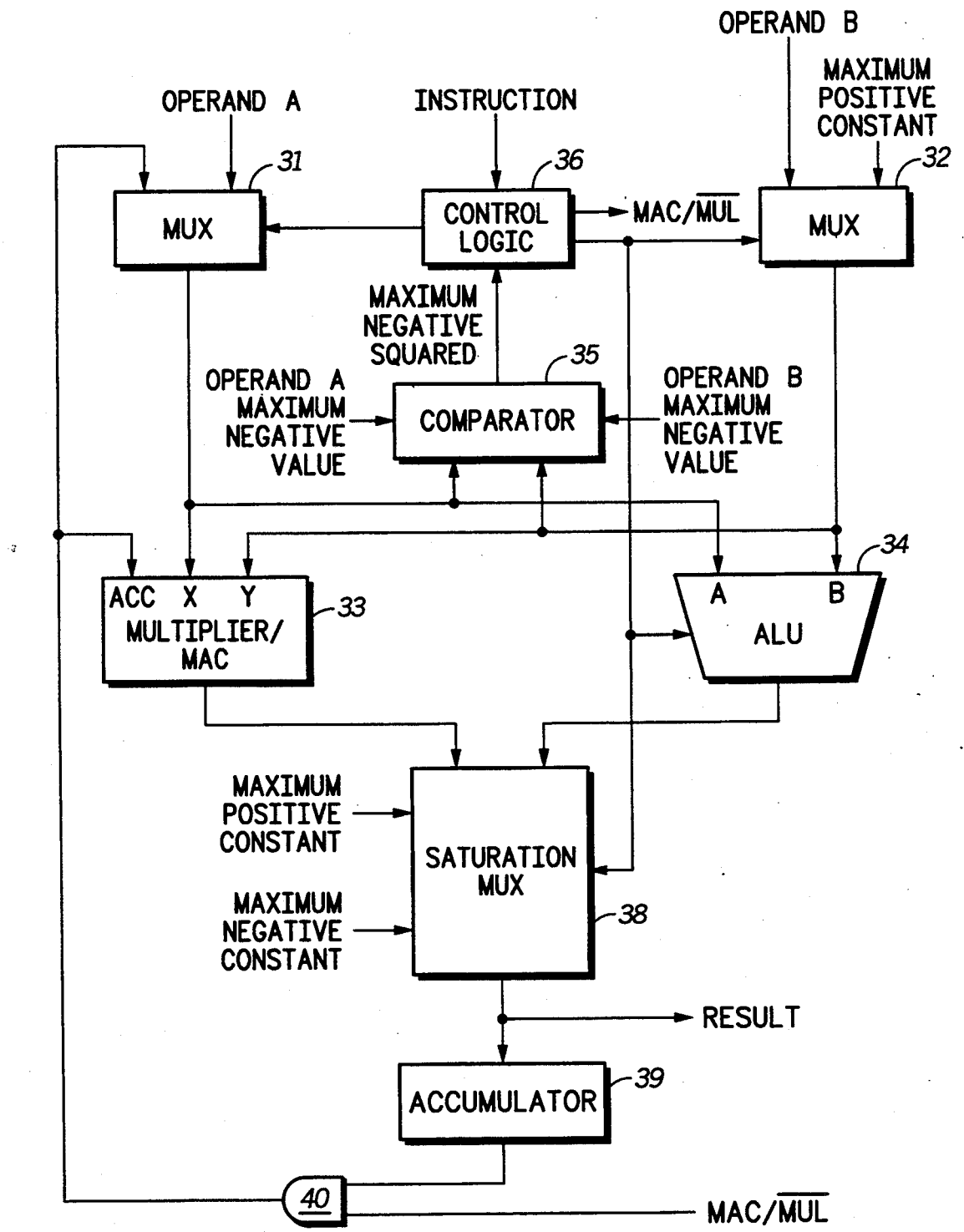
FIG. 2 illustrates in partial block form and partial logic form the arithmetic unit of FIG. 1.

FIG. 2 illustrates in partial block form and partial logic form arithmetic unit 30 of FIG. 1. FIG. 2 illustrates functional blocks of arithmetic unit 30 according to two embodiments of the present invention. Arithmetic unit 30 includes generally multiplexers (MUXes) 31 and 32, a multiplier/multiply-accumulator (MAC) 33, an arithmetic logic unit (ALU) 34, a comparator 35, control logic 36, a saturation MUX 38, an accumulator 39, and an AND gate 40. In response to a MUL or MAC instruction in which OPERAND A and OPERAND B each assume their respective maximum negative values, arithmetic unit 30 substitutes MAXIMUM POSITIVE CONSTANT in place of the normal result of the two's complement multiplication. Thus, arithmetic unit 30 doubles the dynamic range for a given multiplier/ALU width or alternatively, decreases the width by one bit for the same dynamic range.

MUX 31 has a first input, a second input for receiving OPERAND A, a control input for selecting between the first and second inputs, and an output. MUX 32 has a first input for receiving OPERAND B, a second input for receiving the MAXIMUM POSITIVE CONSTANT, a control input for selecting between the first and second inputs, and an output. Multiplier/MAC 33 has an accumulator input labelled "ACC", a multiplier or X input connected to the output of MUX 31, a multiplicand or Y input connected to the output of MUX 32, and an output. ALU 34 has a first or A input connected to the output of MUX 31, a second or B input connected to the output of MUX 32, a third input for receiving a value labelled "OPERAND A MAXIMUM NEGATIVE VALUE" which is the most-negative value OPERAND may assume, a fourth input for receiving value labelled "OPERAND B MAXIMUM NEGATIVE VALUE" which is the most-negative value OPERAND B may assume, a control input, and an output. Comparator 35 has a first input connected to the output of MUX 31, a second input connected to the output of MUX 32, and an output for providing a control signal labelled "MAXIMUM NEGATIVE SQUARED". Control logic 36 has a first input for receiving the INSTRUCTION, a second input for receiving signal MAXIMUM NEGATIVE SQUARED, an output for providing a signal labelled "MAC/$\overline{\text{MUL}}$", and outputs connected to the control inputs of MUX 31, MUX 32, and ALU 34. Saturation MUX 38 has a first input connected to the output of multiplier/MAC 33, a second input connected to the output of ALU 34, a third input for receiving MAXIMUM POSITIVE CONSTANT, a fourth input for receiving a value labelled "MAXIMUM NEGATIVE CONSTANT," and an output. Accumulator 39 has an input connected to the output of saturation MUX 38, and an output. AND gate 40 represents a logic operation between the output of accumulator 39 rather than a single logic gate. AND gate 40 has a first input connected to the output of accumulator 39, a second input for receiving signal MAC/MUL, and an output connected to the first input of MUX 31 and to the ACC input of multiplier/MAC 33.

Arithmetic unit 30 performs additions, subtractions, MUL instructions, MAC instructions, and the like. Operation of instructions other than MUL or MAC instructions, and control signals associated therewith, are omitted. During a MUL instruction, control logic 36 provides signal MAC/$\overline{\text{MUL}}$ at a logic low state, and the output of AND gate 40 is a logic low (binary zero). A normal MUL instruction, in which at least one operand is not equal to its respective maximum negative value, takes place in multiplier/MAC 33. Since at least one operand is not equal to its respective maximum negative value, comparator 35 provides MAXIMUM NEGATIVE SQUARED in an inactive state. Control logic 36 selects OPERAND A at the second input of MUX 31, and OPERAND B at the first input of MUX 32. Control logic 36 also selects the first input of saturation MUX 38 to provide as the RESULT.

During a MUL instruction in which both operands are equal to their respective maximum negative values, comparator 35 activates MAXIMUM NEGATIVE SQUARED. Control logic 36 then determines the destination of the result. If the destination is accumulator 39, then the multiplication proceeds normally between OPERAND A and OPERAND B in multiplier/MAC 33. Multiplier/MAC 33 provides an output having two unequal sign bits, which indicates the maximum negative squared case. When a subsequent instruction causes this value to be stored as the RESULT in memory or a register, if the sign bits are still unequal, saturation MUX 38 substitutes the MAXIMUM POSITIVE CONSTANT as the RESULT. During a MUL instruction in which the destination is memory or a register, control logic 36 causes the output of multiplier/MAC 33 to be ignored. Saturation MUX 38 detects the maximum negative squared case because the two sign bits are not the same, and substitutes the MAXIMUM POSITIVE CONSTANT for the output of multiplier/MAC 33 as the RESULT.

During a MAC instruction, signal MAC/$\overline{\text{MUL}}$ is at a logic high state, and the output of AND gate 40 is equal to the value stored in accumulator 39. A normal MAC instruction, in which at least one operand is not equal to the maximum negative value, takes place in multiplier/MAC 33. Control logic 36 selects OPERAND A at the second input of MUX 31, OPERAND B at the first input of MUX 32, and the first input of saturation MUX 38. If the MAC operation in multiplier/MAC 33 causes an overflow, saturation MUX 38 detects the overflow and substitutes the MAXIMUM POSITIVE CONSTANT or the MAXIMUM NEGATIVE CONSTANT, as appropriate, instead of the output of multiplier/MAC 33. Saturation logic 38 is thus useful in implementing conventional digital signal processing (DSP) algorithms such as FIR filters and the like.

During a MAC instruction in which both operands are equal to their respective maximum negative values, comparator 35 activates MAXIMUM NEGATIVE SQUARED. In the illustrated embodiment, the only permissible destination for a MAC instruction is accumulator 39. Control logic 36 causes MUX 31 to select OPERAND A at its second input, MUX 32 to select OPERAND B at its first input, and saturation MUX 38 to select its first input (the output of multiplier/MAC 33). The output of saturation MUX 38 is then stored in accumulator 39. This stored result indicates the maximum negative squared case because the two sign bits are not the same. When a subsequent instruction causes this value to be stored as the RESULT in memory or a register, saturation MUX 38 substitutes the MAXIMUM POSITIVE CONSTANT.

Because accumulator 39 has the same size as multiplier/MAC 33 (including two sign bits), it is preferable to retain the output of multiplier/MAC 33 as the result when the destination is accumulator 39. However FIG. 2 also illustrates a second embodiment of the present invention in which accumulator 39 has fewer bits than multiplier/MAC 33 and is not able to store two sign bits. Because accumulator 39 only stores one sign bit, arithmetic unit 30 must substitute MAXIMUM POSITIVE CONSTANT for the result to be stored in accumulator 38. In this embodiment, ALU 34 is used as part of the MUL or MAC instruction during the maximum negative squared case. Control logic 36 causes MUX 31 to select its first input, the output of accumulator 39, instead of its second input (OPERAND A). During a MUL instruction, the first input of MUX 31 is forced to zero. During a MAC instruction, the first input of MUX 31 is equal to the value previously stored in accumulator 39. In response to MAXIMUM NEGATIVE SQUARED, control logic 36 causes MUX 32 to select its second input, the MAXIMUM POSITIVE CONSTANT, instead of its first input (OPERAND B), and activates ALU 34. Thus, ALU 34 performs an addition between either the accumulated value or zero, as appropriate, and MAXIMUM POSITIVE CONSTANT, providing this sum at its output. Control logic 36 causes saturation MUX 38 to select its second input (the output of ALU 34). If ALU 34 overflows, saturation MUX 38 detects the overflow and substitutes the MAXIMUM POSITIVE CONSTANT or the MAXIMUM NEGATIVE CONSTANT, as appropriate, instead of the output of ALU 34 as the RESULT.

In both embodiments, arithmetic unit 30 is part of a DSP system which performs two's complement fractional arithmetic. For example, 16-bit operands are represented as a sign bit and fifteen fractional mantissa bits. The most significant mantissa bit represents a fractional value of one-half, the second most significant mantissa bit represents a fractional value of one-fourth, and so on. However, arithmetic unit 30 is equally applicable to a system with integer operands.

Also in the illustrated embodiment, OPERAND A and OPERAND B may each be either byte (8-bit) or word (16-bit) quantities. Multiplexers 31 and 32 convert OPERAND A and OPERAND B, respectively, to 25-bit quantities using predefined conversion rules. For byte operands, multiplexers 31 and 32 insert zeros into the sixteen least-significant bit positions and extend the sign into the twenty-fifth bit position. For word operands, multiplexers 31 and 32 insert zeros into the eight least-significant bit positions and extend the sign into the twenty-fifth bit position.

FIG. 2 illustrates both the MAXIMUM POSITIVE CONSTANT and the MAXIMUM NEGATIVE CONSTANT as being input signals to MUX 32 and/or saturation MUX 38 for conceptual purposes. In the illustrated embodiment, these constants are hard-wired into their respective circuits. Furthermore, the MAXIMUM POSITIVE CONSTANT and the MAXIMUM NEGATIVE CONSTANT each represent two possible values, selected according to the destination of the RESULT. If the destination is 25-bit accumulator 39, then a first MAXIMUM POSITIVE CONSTANT having a 25-bit value of 0FFFFFF hexadecimal is used. If the destination is not accumulator 39 (i.e., a 16-bit destination), then a second MAXIMUM POSITIVE CONSTANT having a 16-bit value of 7FFF hexadecimal is used (since the twenty-fifth bit and the eight least-significant bits are dropped). Likewise, saturation MUX 38 receives a MAXIMUM NEGATIVE CONSTANT having either a 25-bit value of 1000000 hexadecimal or a 16-bit value of 8000 hexadecimal, depending on the destination. It should be apparent that the values of the different constants used will depend on the data type and that many more values are possible in different embodiments.

Multiplier/MAC 33 multiplies together the sixteen most-significant bits of the 25-bit quantities at its X and Y inputs to provide a 32-bit product. Multiplier/MAC 33 also scales (left-shifts) the fractional product by one bit. During a MAC instruction, multiplier/MAC 33 adds the product to the 25-bit ACC input. The output is then truncated to the twenty-five most significant bits, including two sign bits and twenty-three mantissa bits. Different values for the two sign bits represent an overflow. If the destination is accumulator 39, then all twenty-five bits are retained. If the destination is not accumulator 39, then a sign bit and the fifteen most-significant mantissa bits are provided as the RESULT. However it should be apparent that arithmetic unit 30 is scalable to accommodate any general M-bit-by-N-bit MUL and MAC instructions.

While the invention has been described in the context of a preferred embodiment, it will be apparent to those skilled in the art that the present invention may be modified in numerous ways and may assume many embodiments other than that specifically set out and described above. For example, in the first embodiment, it is not necessary to include comparator 35 or to provide MAXIMUM POSITIVE CONSTANT as an input to MUX 32. Many different operands sizes and data types are possible. Also, fractional or integer arithmetic is contemplated. Accordingly, it is intended by the appended claims to cover all modifications of the invention which fall within the true spirit and scope of the invention.

We claim:

1. A method for multiplying two numbers using signed arithmetic, comprising the steps of:
   detecting a multiplication instruction in which first and second operands assume respective first and second maximum negative values thereof;
   providing said first and second operands respectively to first and second inputs of a multiplier, and providing an output of said multiplier as a result, in response to either said first operand not equaling said first maximum negative value, or said second operand not equaling said second maximum negative value; and
   substituting a maximum positive constant as said result in response to both said first operand equaling said first maximum negative value and said second operand equaling said second maximum negative value,
   said step of detecting further comprising the step of comparing said first operand with said first maximum negative value and said second operand with said second maximum negative value in comparator means.

2. The method of claim 1 wherein said step of substituting said maximum positive constant comprises the steps of:
   providing said maximum positive constant as a first input to adder means;
   providing zero as a second input to said adder means; and
   providing an output of said adder means as said result.

3. The method of claim 1 wherein said step of substituting said maximum positive constant comprises the steps of:
   providing said maximum positive constant as a first input to adder means;
   providing an output of an accumulator as a second input to said adder means; and
   providing an output of said adder means as said result.

4. In a data processing system, a method for multiplying two numbers using signed arithmetic comprising the steps of:
   comparing a first operand with a first number, said first number being a maximum negative value of said first operand;
   comparing a second operand with a second number, said second number being a maximum negative value of said second operand;
   providing a product of said first number and said second number as a result in response to either said first operand not equaling said first number or said second operand not equaling said second number; and
   providing a maximum positive constant as said result in response to both said first operand equaling said first number and said second operand equaling said second number.

5. The method of claim 4 wherein said step of comparing said first operand with said first number comprises the step of comparing said first operand expressed as an M-bit two's complement number with said first number, wherein said step of comparing said second operand with said second number comprises the step of comparing said second operand expressed as an N-bit two's complement number with said second number, and wherein said step of providing said maximum positive constant comprises the step of providing a maximum positive constant having $(M+N-1)$ bits in response to both said first operand equaling said first number and said second operand equaling said second number.

6. The method of claim 4 wherein said step of comparing said first operand with said first number comprises the step of comparing said first operand with said first number in comparator means.

7. The method of claim 6 wherein said step of comparing said second operand with said second number comprises the step of comparing said second operand with said second number in said comparator means.

8. An apparatus for multiplying two numbers using signed arithmetic comprising:
   comparator means for receiving first and second operands, and for activating a control signal in response to said first and second operands each being a respective maximum negative value thereof;
   a multiplier having a first input for receiving said first operand, a second input for receiving said second operand, and an output for providing a product; and
   substitution means for providing either a maximum positive constant as a result in response to an activation of said control signal, or said product as said result in response to said control signal being inactive.

9. The apparatus of claim 8 wherein said first operand is characterized as being a signed number having a first predetermined number of bits, wherein said second operand is characterized as being a signed number having a second predetermined number of bits, and wherein said maximum positive constant is characterized as being a maximum positive value of a number having said first predetermined number plus said second predetermined number minus one bits.

10. The apparatus of claim 9 wherein said first and second operands and said maximum positive value are each expressed in two's complement form.

11. The apparatus of claim 8 wherein said substitution means comprises:
 a first multiplexer having a first input for receiving said second operand, a second input for receiving said maximum positive constant, and an output;
 an arithmetic logic unit having a first input for receiving said first operand, a second input coupled to said output of said first multiplexer, and an output; and
 a second multiplexer having a first input coupled to said output of said multiplier, a second input coupled to said output of said arithmetic logic unit, and an output for providing said result.

12. The apparatus of claim 11 further comprising:
 an accumulator having an input coupled to said output of said second multiplexer, and an output;
 control means coupled to said accumulator, for providing either said output of said accumulator or zero in response to a second control signal;
 a third multiplexer having a first input coupled to said output of said control means, a second input for receiving a third operand, and an output for providing said first operand; and
 said multiplier further having an accumulator input coupled to said output of said control means.

13. The apparatus of claim 12 wherein said third multiplexer provides said output of said control means as said first operand in response to said second control signal.

* * * * *